United States Patent
Evans (10) Patent No.: US 9,862,507 B2
(45) Date of Patent: Jan. 9, 2018

(54) CUBESAT FORM FACTOR THERMAL CONTROL LOUVERS

(71) Applicant: The United States of America as represented by the Administrator of the National Aeronautics and Space Administration, Washington, DC (US)

(72) Inventor: Allison L. Evans, Greenbelt, MD (US)

(73) Assignee: The United States of America as represented by the National Aeronautics and Space Administration, Washington, DC (US)

( * ) Notice: Subject to any disclaimer, the term of this patent is extended or adjusted under 35 U.S.C. 154(b) by 224 days.

(21) Appl. No.: 14/867,896

(22) Filed: Sep. 28, 2015

(65) Prior Publication Data
US 2017/0088294 A1    Mar. 30, 2017

(51) Int. Cl.
*B64G 1/00* (2006.01)
*B64G 1/50* (2006.01)

(52) U.S. Cl.
CPC ............. *B64G 1/503* (2013.01); *B64G 1/506* (2013.01)

(58) Field of Classification Search
CPC ....... B60K 11/085; B64G 1/503; B64G 1/506
USPC ................... 165/86, 236; 454/222
See application file for complete search history.

(56) References Cited

U.S. PATENT DOCUMENTS

| | | | | |
|---|---|---|---|---|
| 1,471,510 A | * | 10/1923 | Willis | B60K 11/085 123/41.05 |
| 1,501,933 A | * | 7/1924 | Wilson | B60K 11/085 236/35.3 |
| 1,542,407 A | * | 6/1925 | Raleigh | B60K 11/085 123/41.04 |
| 1,619,621 A | * | 3/1927 | Lovejoy | B60K 11/085 123/41.05 |
| 1,660,146 A | * | 2/1928 | Winans | B60K 11/085 165/11.1 |
| 1,988,916 A | * | 1/1935 | Prosdocimi | B64C 39/005 244/22 |
| 3,115,223 A | * | 12/1963 | Shustrom | B60K 11/085 160/236 |
| 3,348,790 A | * | 10/1967 | Crowder | B64G 1/24 244/171.8 |
| 3,872,911 A | * | 3/1975 | Janes | B64G 1/50 160/1 |
| 6,538,796 B1 | * | 3/2003 | Swanson | B64G 1/50 359/290 |
| 2002/0056790 A1 | * | 5/2002 | Trimmer | B64G 1/50 244/171.7 |

* cited by examiner

*Primary Examiner* — Justin Jonaitis
(74) *Attorney, Agent, or Firm* — Matthew F. Johnston; Bryan A. Geurts; Mark P. Dvorscak (57) ABSTRACT

Thermal control louvers for CubeSats or small spacecraft may include a plurality of springs attached to a back panel of the thermal control louvers. The thermal control louvers may also include a front panel, which includes at least two end panels interlocked with one or more middle panels. The front panel may secure the springs, shafts, and flaps to the back panel.

20 Claims, 8 Drawing Sheets

Fig. 2C

CUBESAT FORM FACTOR THERMAL CONTROL LOUVERS

ORIGIN OF THE INVENTION

The invention described herein was made by employees of the United States Government, and may be manufactured and used by or for the Government for Government purposes without the payment of any royalties thereon or therefore.

FIELD

The present invention relates to control louvers, and more particularly, to a thermal control louver assembly based on a CubeSat form factor designed for small spacecraft missions.

BACKGROUND

CubeSats have not required thermal control outside of resistive heaters due to low power requirement and a short lifespan. However, in the past few years, CubeSat form factor solar panels have been developed producing up to 80 W of power for a 3 U, i.e., a 30 by 30 by 10 cm, spacecraft. Furthermore, many CubeSat and small satellite missions, such as CeRES and LWaDi, are being proposed with high power instruments and subsystems on board. As a result, a thermal control louver assembly based on the CubeSat form factor has become critical for small spacecraft missions.

Previous designs for thermal louvers have been for full-sized spacecraft, which are several feet in diameter. These thermal louvers operate via metallic springs attached to flaps having a low-emissivity coating on the outside surface and high emissivity coating or direct view to the components underneath. When the components inside the spacecraft reach a high temperature, the bimetallic springs uncurl causing the flaps to open and change the emissivity of the spacecraft. However, thermal louvers for full-sized spacecraft cannot be used on a CubeSat or on small spacecraft. This is primarily due to the size of the thermal louvers.

In an effort to remedy this issue, an adaption of this technology for smaller spacecraft involved Micromachined Louver Arrays (MLAs), which were on a microscopic scale and actuated using electric current, i.e., an active means of louver actuation. However, this adaption requires an active control and a tendency for dust to accumulate inhibits the movement of the micro-scale flaps. Thus, an alternative approach may be beneficial.

SUMMARY

Certain embodiments of the present invention may provide solutions to the problems and needs in the art that have not yet been fully identified, appreciated, or solved by current louver assemblies. Embodiments of the present invention pertains to thermal control louvers for CubeSats and small spacecraft. For example, thermal control louvers may include a back panel and multiple springs attached to the back panel.

In one embodiment, thermal control louvers may include a front panel securing a plurality of flaps to a back panel. The front panel may cover the spring to protect the spring from heat from outside of the apparatus. The front panel may include a plurality of panels interlocking with each other to form the front panel.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Embodiments of the present invention generally pertain to thermal control louvers for a CubeSat or small spacecraft. FIGS. 1A-1E are perspective views illustrating thermal control louvers 100 for a CubeSat, according to an embodiment of the present invention. Thermal control louvers 100 may include a back panel 105, a front panel 110, flaps 115, shafts 135, and springs 120. See, for example, FIGS. 1A and 1B. While thermal control louvers 100 include five rows and two columns of flaps 115, the number of rows and columns of flaps 115 depend on the mission's thermal requirements. This allows thermal control louvers 100 to be adaptable to a variety of CubeSat and small satellite missions.

Figure 1A:
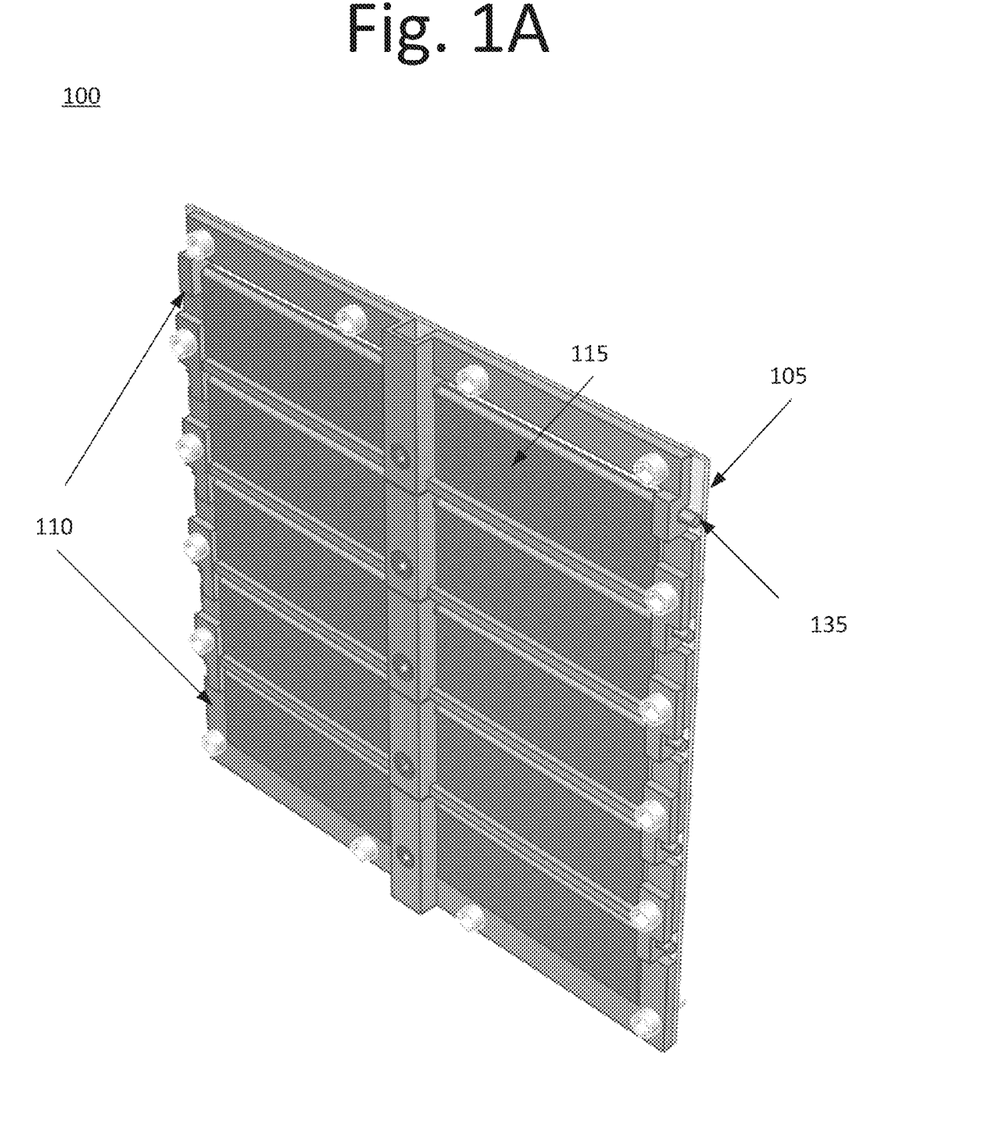
FIGS. 1A-1E are perspective views illustrating a thermal control louvers for a CubeSat, according to an embodiment of the present invention.
Figure 1B:
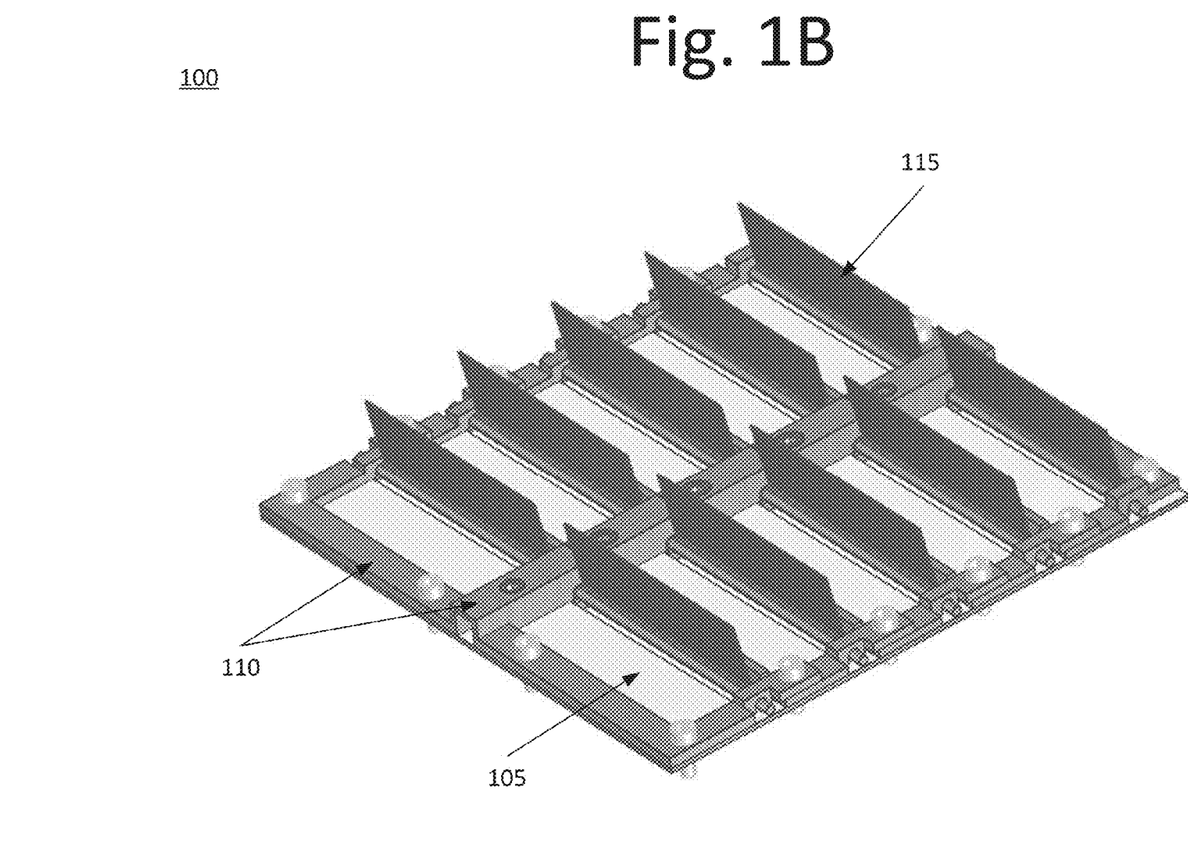
Figure 1C:
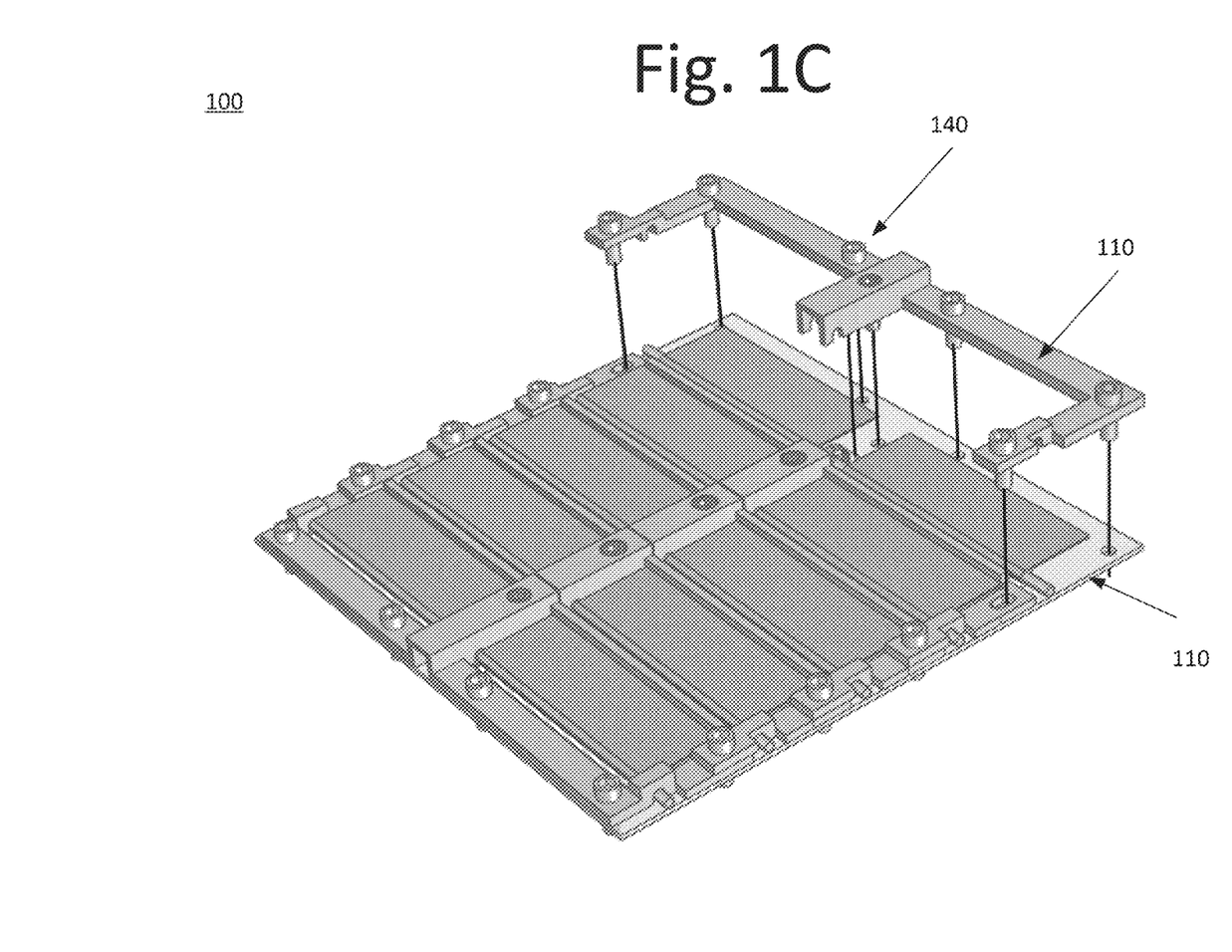
Figure 1D:
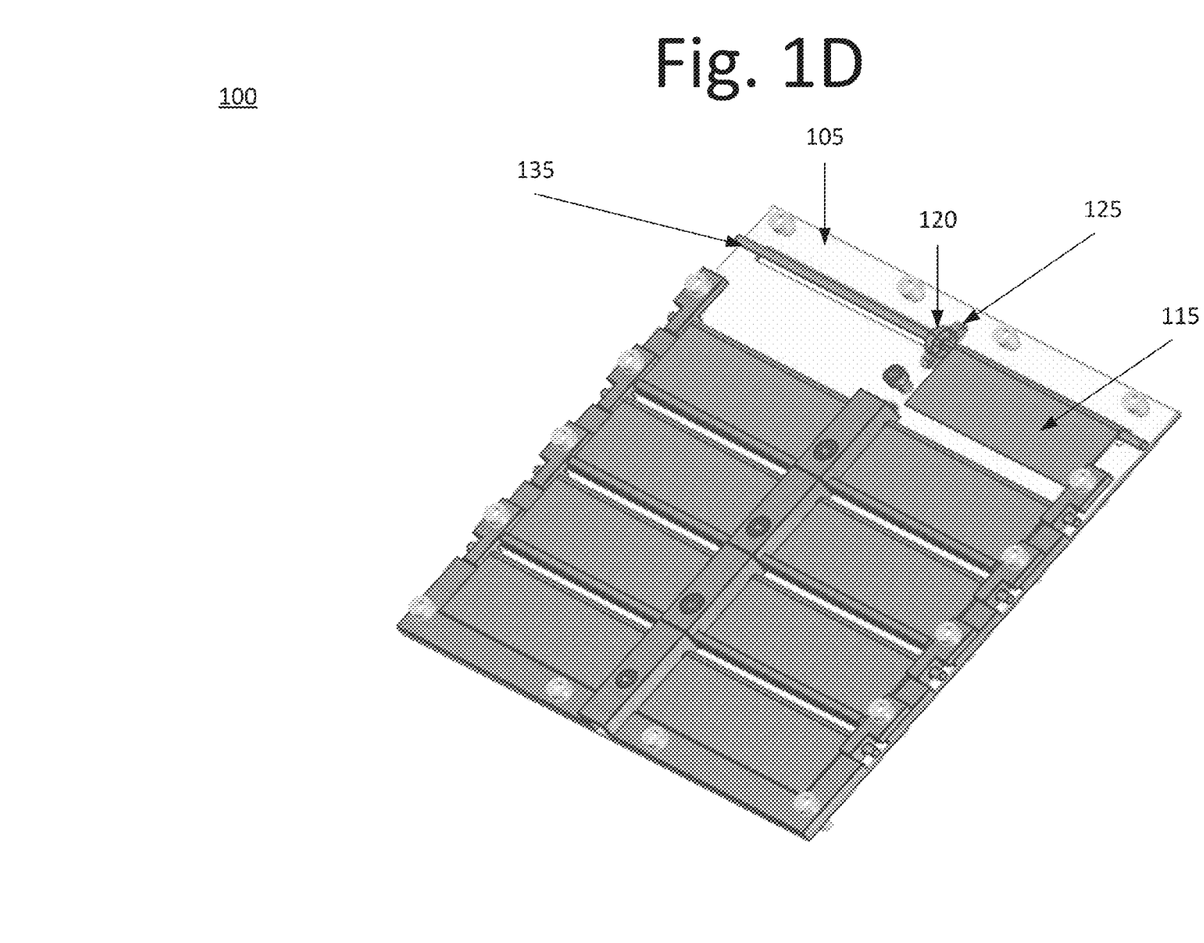
Figure 1E:
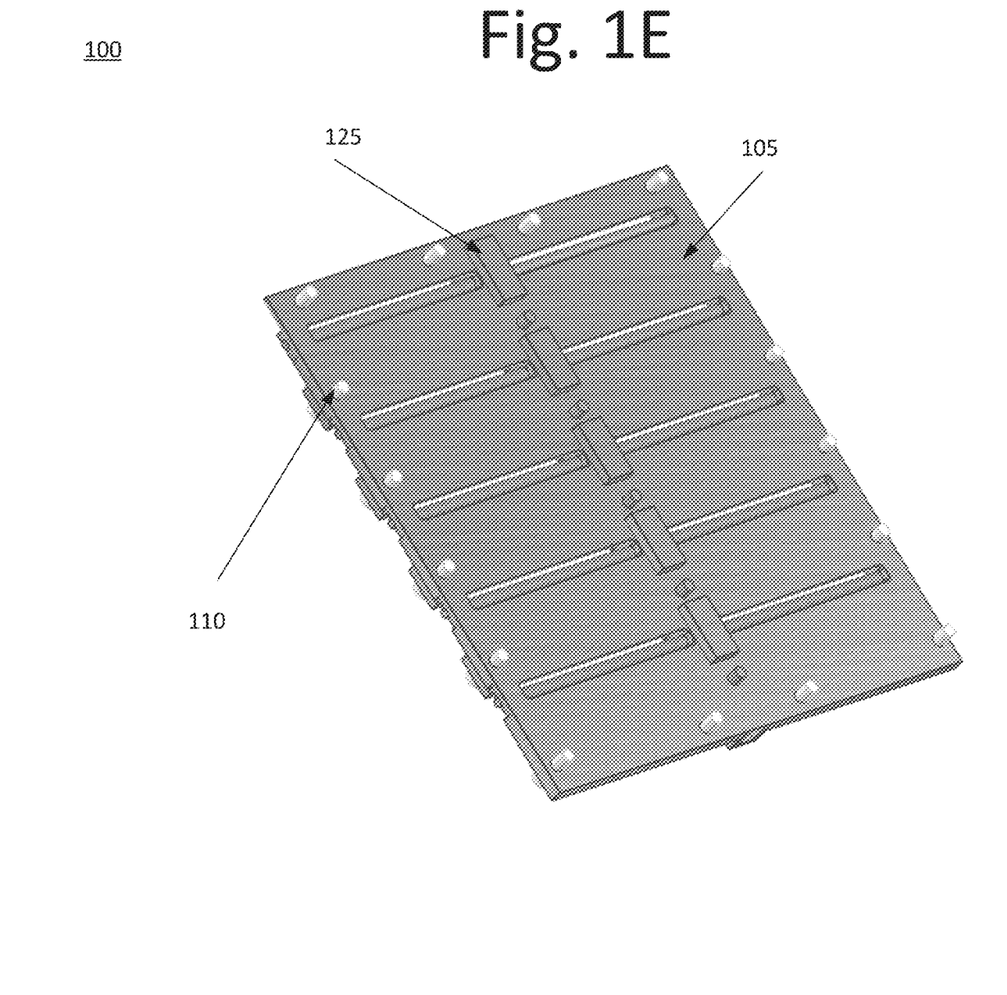

As shown more clearly in FIGS. 1D, and 1E back panel 105 may be made of an aluminum sheet. This material, for example, is lightweight and fairly thermally conductive, providing a good base for heat to transfer through to bimetallic springs. A paint, such as Z93C55, may be used to coat the flap-facing surface of back panel 105 to achieve a specified emissivity. In some embodiments, back panel 105 may have uniform thickness of approximately 0.05 inch, and a middle channel with a depth of approximately 0.108 inch and a width of approximately 0.260 inch. It should be appreciated that the size and depth of back panel 105 may vary depending on the mission's requirements.

As shown in FIG. 1D, the middle channel of back panel 105 may include cavities or holes 125 allowing springs 120, such as bimetallic springs, to be attached to back panel 105. In some embodiments, thermal control louvers 100 may not include a middle channel exposing springs 120 to the outside environment. In a further embodiment, thermal control louvers 100 may move the middle channel to the side or to end of thermal control louvers 100. This may allow for larger springs and flaps to be constructed on thermal control louvers 100, thereby providing a larger surface area view of back panel 105 resulting in more heat being transferred to the outside environment. Heat straps may be used to transfer heat from interior components to the back of back panel 105. These heat straps may be made from materials, such as copper or aluminum, and may be composed of solid metal, metal braiding, or similar material. In some embodiments, a heat pipe may be used instead of heat straps due to high heat loads. For example, heat pipes and/or heat straps may transfer high heat loads from internal components of the CubeSat or small spacecraft to thermal control louvers 100 or back panel 105. Both springs 120 and heat straps may be attached via a thermal conductive epoxy. A thermal epoxy, such as Stycast 2859FT/Catalyst 9, may be used to guarantee that the heat is moved as efficiently as possible from the internal components whose temperature must be controlled.

Front panel 110 may be placed on top of back panel 105 in some embodiments to secure flaps 115, springs 120, and shafts 135. See, for example, FIG. 1C. In some embodiments, screws or bolts may secure front panel 110 to back panel 105. In some embodiments, an epoxy may be used to permanently secure or affix front panel 110 to back panel 105.

It should be appreciated that front panel 110 may include multiple pieces, e.g., two end panels and one or more middle panels depending on the size of the CubeSat. The end panels may be attached to the ends of back panel 105, and the middle panels may be attached to the remaining portions of back panel 105. The end panels and the middle panels are interlocked with each other to form front panel 110.

Figure 2A:
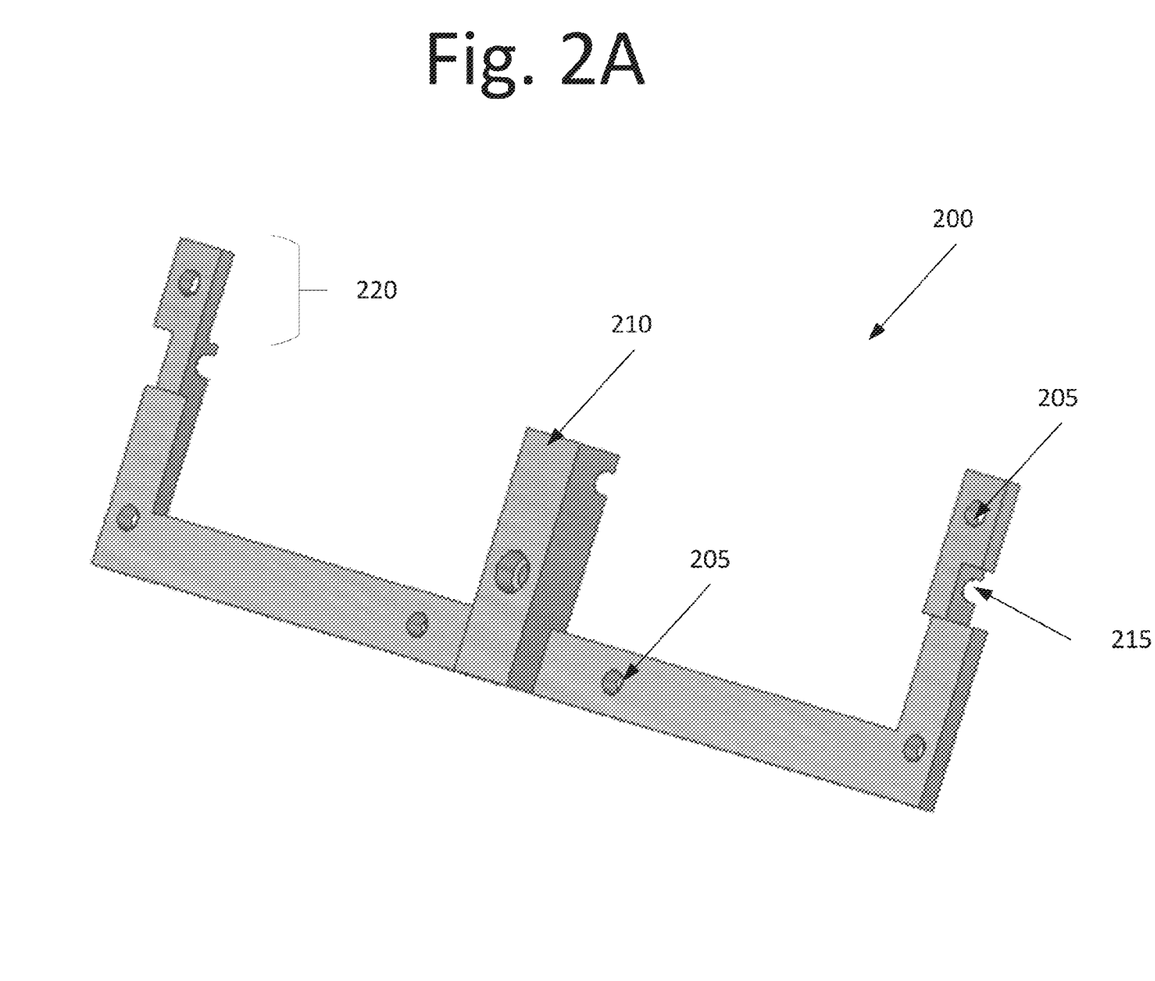
FIG. 2A is a perspective view illustrating a first end panel, according to an embodiment of the present invention.
Figure 2B:
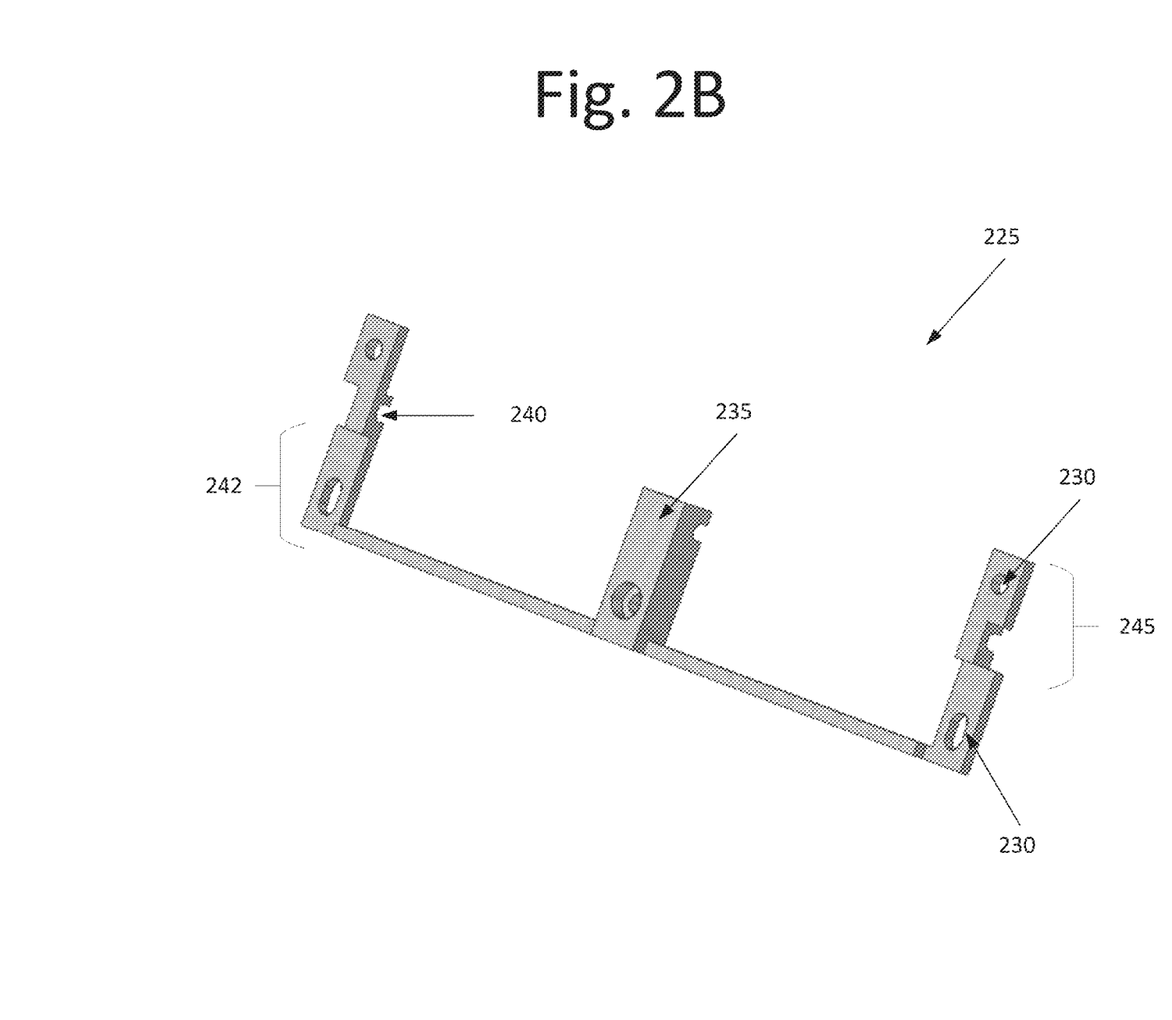
FIG. 2B is a perspective view illustrating a middle panel, according to an embodiment of the present invention.
Figure 2C:
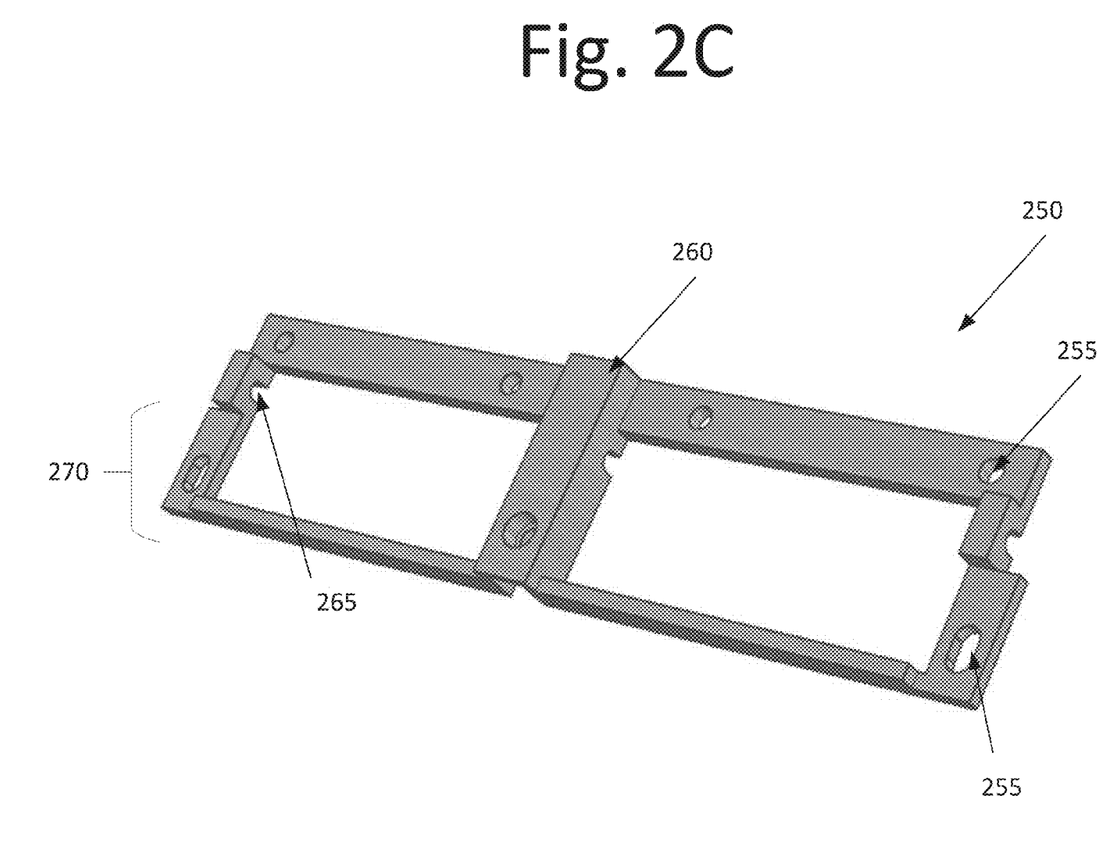
FIG. 2C is a perspective view illustrating a second end panel, according to an embodiment of the present invention.

FIGS. 2A-2C are perspective views illustrating a first end panel 200, a middle panel 225, and a second end panel 250, according to an embodiment of the present invention. In some embodiments, first end panel 200, middle panel 225, and second end panel 250 may include holes 205, 230, 255, respectively. This way, screws or bolts may be inserted into holes 205, 230, 255 affixing first end panel 200, middle panel 225, and second end panel 250, creating a modular front panel. First end panel 200, middle panel 225, and second end panel 250 may also include a center channel 210, 235, 260, respectively, to cover the spring. First end panel 200, middle panel 225, and second end panel 250 may further include grooves or recesses 215, 240, 265, respectively, to secure the shaft in place when first end panel 200, middle panel 225, and second end panel 250 are placed on top of the back panel.

In order to interlock first end panel 200 with middle panel 225, first end panel 200 may include an elevated section 220 that will be placed on top of, or placed above, a flat section 242 of middle panel 225. A screw or bolt may then be inserted within holes 205 of elevated section 220 and holes 230 of flat section 242 to secure first end panel 200 and middle panel 225 together. In a similar fashion, second end panel 250 may include a flat section 270, which slides underneath, or is placed beneath, elevated section 245 of middle panel 225, interlocking middle panel 225 with second end panel 250. A screw or bolt may then be inserted within holes 230 of elevated section 245 and holes 255 of flat section 270 securing second end panel 250 and middle panel 225 together.

In order to interlock middle panel 225 with another middle panel, elevated section 245 of middle panel 225 may be placed over a flat section of the other middle panel, and a screw or bolt may be inserted into holes of middle panel securing the middle panels together. This allows the front panel to be modular, i.e., increase or decrease in size. It should be appreciated that in some embodiments screws may be inserted through each hole of first end panel 200, one or more middle panels 225, and a second end panel 250 to secure the front panel to the back panel.

Returning to FIG. 1, front panel 100 may be made out of three-dimension (3D) printed titanium to protect the spring and prevent the spring from being heated from the outside. In other embodiments, the front panel may be made out of 3D printed aluminum. However, it should be appreciated that the composition of the front panel is not limited to titanium or aluminum, and may be made of other material depending on the mission's requirements.

Also, in some embodiments, front panel 110 may have a thickness of approximately 0.05 inch and a middle channel may have a depth of approximately 0.217 inch and a width of approximately 0.260 inch. It should be appreciated that the size of front panel 110 and back panel 105 may be the same, and configured to fit the CubeSat. Regardless of the thickness of the panels, the nature of the embodiments described herein remain constant.

Furthermore, the height, width, and thickness of the middle channel of the panel may change without affecting the nature of the embodiments described herein. Simply stated, the change in dimensions may accommodate a slightly longer or shorter coiled bimetal spring, according to the required temperature range of the spacecraft and the width of the flaps. In some embodiments, the width of the flaps may also change if the width of the front and back panels changed. This may occur depending on the size of the CubeSat.

Furthermore, in some embodiments, back panel 105 may face or may be connected to the CubeSat, while front panel 110 may be exposed to outside environment. This way, as heat from CubeSat travels to springs 120, flaps 115 may open as springs 120 expand. FIG. 1B, for example, shows flaps 115 opening in an outward direction. Flaps 115 may be attached to front panel 110 in some embodiments.

In certain embodiments, flaps 115 may be made of a thin metal material, such as aluminum in some embodiments. The flaps must be thin enough to be lifted by springs 120 in a ground testing environment, and may be made of 0.010 inch thick aluminum in certain embodiments.

Flaps 115 may be coated with a reflective paint or polished to achieve a specified emissivity. Material used to form flaps 115 may be selected based on a number of factors, such as temperature, cost, structural strength, outgassing, and buildability of flaps 115 using a given material.

As mentioned above, flaps 115 are arranged in rows and columns. Each pair of flaps 115 is connected or coupled to a shaft 135, which is connected to a spring 120. See, for example, FIG. 1D. Simply put, each spring 120 is coupled to at least two flaps 115. This way, when spring 120 expands, a pair of flaps 115 will open outward.

Springs 120 in some embodiments may be made of metals, such as Truflex B1 and type P675R. It should be appreciated that other types of metals may be used depending on the mission's requirement. As shown in FIG. 1D, springs 120 may be attached to a middle channel of back panel 105. In some embodiments, thermally conductive epoxy may be used to attach springs 120 to the middle channel of back panel 105. Similarly, thermal conductive epoxy may also be used to attach springs 120 to shafts 135.

As mentioned above, a coating on the outside surface of front panel 110 and flaps 115, and the outside surface of back panel 105, may determine the emissivity changing properties of thermal control louvers 100. For example, a white paint on front panel 110 and flaps 115 may create a cold-biased system. In another example, a polished metallic front panel 110 and flaps 115 may create a warm-biased system. In other words, the application of coating may depend entirely on the mission's requirements.

In some embodiments, heat dissipating parts or components on the inside of the spacecraft may have heat straps attached to the inside surface of back panel 105. The outside surface of back panel 105 may have springs 120 thermally epoxied to the middle channel of back panel 105. As springs 120 expand under increasing temperature loads from back panel 105, springs 120 may uncurl and rotate shafts 135, causing flaps 115 to open. For example, at 150 Fahrenheit, flaps 115 may open to 90 degrees from a closed state in some embodiments. However, in other embodiments, the degree at which flaps 115 open depend on the constraints applied by the structure of front panel 110, and in some embodiments, the middle panel.

When, for example, back panel 105 cools, springs 120 may curl again, causing shafts 135 to rotate in the opposite direction brining flaps 120 from an open state to a closed state. In other words, when the temperature of back panel 105 cools, springs 120 may return to its original state, i.e., a closed state. In some embodiments, springs 120 may be on the order of 1/4 inch in diameter. However, the size of spring 120 depends on the requirements of the mission.

Thermal control louvers 100 in one or more embodiments allow for passive actuation, built-in redundancy, and adaptability, while maintaining a standard form factor. For example, because springs 120 are used in some embodiments, passive actuation of flaps 115 is achieved. This allows power to be conserved on a small satellite or CubeSat. Furthermore, because each row of flaps 115 is controlled by a spring 120, built-in redundancy can be achieved. For example, if one spring 120 fails, then only one pair of flaps 115 will be inactive, while the remaining pair of flaps 115 will be operational for thermal control.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. Thermal control louvers for a CubeSat or small spacecraft, comprising:
a plurality of springs attached to a back panel of the thermal control louvers; and
a plurality of panels interlocking together to form a modular front panel, wherein the modular front panel secures the plurality of springs, a plurality of shafts, and a plurality of flaps to the back panel.

2. The thermal control louvers of claim 1, wherein the modular front panel is made of three dimension printed material to protect the plurality of springs from being heated from outside of the thermal control louvers.

3. The thermal control louvers of claim 2, wherein the three dimension printed material comprises titanium or aluminum.

4. The thermal control louvers of claim 1, wherein the back panel comprises a plurality of cavities allowing the plurality of springs to be attached to the back panel.

5. The thermal control louvers of claim 4, wherein the plurality of springs are affixed to the back panel and the plurality of shafts using an epoxy.

6. The thermal control louvers of claim 1, wherein the plurality of panels comprises a first end panel, a second end panel, and one or more middle panels, the first end panel is interlocked with the one or more middle panels, and the one or more middle panels are interlocked with the second end panel to form the modular front panel.

7. The thermal control louvers of claim 6, wherein the first end panel comprises an elevated section that slides above a flat section of the one or more middle panels to interlock the first end panel and the one or more middle panels.

8. The thermal control louvers of claim 6, wherein the second end panel comprises a flat section that slides underneath an elevated section of the one or more middle panels to interlock the first end panel and the one or more middle panels.

9. The thermal control louvers of claim 6, wherein the first end panel, the second end panel, and the one or more middle panels comprise a middle channel to cover the plurality of springs.

10. The thermal control louvers of claim 6, wherein the first end panel, the second end panel, and the one or more middle panels comprise a recess to maintain the position of the plurality of shafts.

11. Thermal control louvers for a CubeSat or small spacecraft, comprising:
a plurality of panels interlocked together to form a modular front panel, wherein
the modular front panel secures a plurality of springs, a plurality of shafts, and a plurality of flaps to a back panel of the thermal control louvers, and restricts the plurality of flaps from opening beyond a certain angle.

12. The thermal control louvers of claim 11, wherein the modular front panel is made of three dimension printed material to protect the plurality of springs from being heated from outside of the thermal control louvers.

13. The thermal control louvers of claim 12, wherein the three dimension printed material comprises titanium or aluminum.

14. The thermal control louvers of claim 11, wherein the back panel comprises a plurality of cavities allowing the plurality of springs to be attached to the back panel.

15. The thermal control louvers of claim 14, wherein the plurality of springs are affixed to the back panel and the plurality of shafts using an epoxy.

16. The thermal control louvers of claim 11, wherein the plurality of panels comprises a first end panel, a second end panel, and one or more middle panels, the first end panel is interlocked with the one or more middle panels, and the one or more middle panels are interlocked with the second end panel to form the modular front panel.

17. The thermal control louvers of claim 16, wherein the first end panel comprises an elevated section that slides above a flat section of the one or more middle panels to interlock the first end panel and the one or more middle panels.

18. The thermal control louvers of claim 16, wherein the second end panel comprises a flat section that slides underneath an elevated section of the one or more middle panels to interlock the first end panel and the one or more middle panels.

19. The thermal control louvers of claim 16, wherein the first end panel, the second end panel, and the one or more middle panels comprise a middle channel to cover the plurality of springs.

20. The thermal control louvers of claim 16, wherein the first end panel, the second end panel, and the one or more middle panels comprise a recess to maintain the position of the plurality of shafts.

* * * * *